United States Patent [19]
Bretaudeau et al.

[11] Patent Number: 5,711,513
[45] Date of Patent: Jan. 27, 1998

[54] HYDRAULIC ANTIVIBRATION SUPPORT SLEEVES

[75] Inventors: Jean-Pierre Bretaudeau, Chateaudun; Paul Schwartz, Chateaudun; Daniel Le Guillant, Conie-Molitard, all of France

[73] Assignee: Hutchinson, Paris, France

[21] Appl. No.: 582,067

[22] Filed: Jan. 2, 1996

[30] Foreign Application Priority Data

Jan. 4, 1995 [FR] France ..................... 95 00041

[51] Int. Cl.⁶ ..................................... F16F 7/00
[52] U.S. Cl. ............... 267/140.12; 267/293; 267/141.4
[58] Field of Search .................. 267/140.12, 141.2, 267/141.3, 141.4, 293, 292; 248/562, 636

[56] References Cited

U.S. PATENT DOCUMENTS

| | | | |
|---|---|---|---|
| 4,822,010 | 4/1989 | Thorn | 267/219 |
| 4,840,359 | 6/1989 | Hamaekers et al. | 267/140.12 |
| 4,944,482 | 7/1990 | Bouhier et al. | 248/562 |
| 5,013,012 | 5/1991 | Jouade | 267/140.12 |
| 5,088,702 | 2/1992 | Thelamon et al. | 267/140.12 |
| 5,092,565 | 3/1992 | Hamaekers et al. | 267/140.12 |
| 5,102,106 | 4/1992 | Thelamon et al. | 267/140.12 |
| 5,169,130 | 12/1992 | Thelamon et al. | 267/140.12 |

FOREIGN PATENT DOCUMENTS

| | | | |
|---|---|---|---|
| 566178 | 10/1993 | European Pat. Off. | 267/140.12 |
| 43 05 808 | 1/1994 | Germany. | |
| 61-286633 | 12/1986 | Japan | 267/140.12 |

OTHER PUBLICATIONS

Patent Abstracts of Japan, vol. 14, No. 373, Appln. No. 63-216165, Tsukasa Oshima

*Primary Examiner*—Peter M. Poon
*Attorney, Agent, or Firm*—Larsen & Taylor

[57] ABSTRACT

The sleeve comprises two tubular rigid strength members (4,5) where one surrounds the other and where they are united by an elastomer body (6) shaped so as to co-operate therewith to form two sealed cavities (7,8) that communicate with each other via a narrow channel (9), the cavities and the channel being completely filled in a liquid, the portion of the elastomer body that defines at least one of the cavities having a generally U-shaped or V-shaped axial section that is outwardly open in a radial direction, and the narrow channel extending along an arc of a circle disposed at an axial end of the sleeve, close to its outer strength member (5). The outer strength member forms an integral portion of a rigid connection arm (11), and the narrow channel is defined in part by a radial flange (16) of a cage (15) received in the outer strength member.

4 Claims, 3 Drawing Sheets

HYDRAULIC ANTIVIBRATION SUPPORT SLEEVES

The invention relates to hydraulic antivibration support sleeves comprising two tubular rigid strength members with one surrounding the other and both preferably constituted, at least in part, by bodies of revolution, said members being coaxial and concentric, at least under load, and being united by an elastomer body shaped to co-operate therewith to form at least two diametrically opposite sealed cavities that communicate with each other via a narrow channel, said cavities and said channel being completely filled with a damping liquid.

Such sleeves are intended for mounting between two rigid structures or parts suitable for connection to respective ones of the two strength members and liable to be subjected to oscillations one relative to the other in the diametral-direction defined by the cavities, the assembly being organized in such a manner that for at least some of said oscillations the liquid is driven alternately from one of the cavities to the other and back again via the narrow channel, thereby creating a resonance phenomenon in the liquid at certain frequencies of oscillation suitable for damping the transmission of the oscillations from one of the strength members to the other.

Sleeves of the kind in question are intended, for example, to be interposed between a vehicle chassis and the internal combustion engine or the front or rear suspension assemblies of the vehicle.

Amongst support sleeves of the above kind, the invention relates more particularly to those in which:

the portion of the elastomer body that defines at least one of the cavities is generally U-shaped or V-shaped in axial section, being outwardly open in a radial direction; and the narrow channel interconnecting the two cavities extends over an arc of a circle centered on the axis of the sleeve and is disposed at an axial end of the sleeve, close to its outer strength member.

In known embodiments of such sleeves (see patent U.S. Pat. No. 5,013,012), the outer strength member is constituted by a length of independent continuous tube surrounding the elastomer body and forming a box for the assembly.

Those embodiments may be advantageous when the rigid structure or part on which the outer strength member is to be fixed itself includes a cylindrical bearing or housing suitable for directly receiving said outer strength member as a force-fit.

The invention relates more particularly to the case when the outer strength member of the sleeve needs to be fixed to a rigid structure or part that is offset therefrom by means of a rigid arm.

One of the objects of the present invention is to simplify the overall mounting of such a sleeve on such a structure and to reduce the cost of the assembly by reducing the number of parts required and the number of fixing operations that are necessary.

It is appropriate at this point to recall that proposals have already been made to constitute the outer strength member of a hydraulic antivibration sleeve by an integral portion of a connection arm (see patent U.S. Pat. No. 4,690,389).

However, in the embodiments proposed for such an assembly, the narrow channel forming an arc of a circle interconnecting the two cavities extends in a plane transverse to the sleeve and disposed in the middle of the axial dimension of the sleeve, thereby making manufacture of the arm difficult, whether by molding or otherwise.

The invention presents not only the above-mentioned advantage of simplification by reducing the number of component parts in the sleeve-and-arm assembly, but also the advantage of considerably simplifying the construction of the narrow channel.

To this end, according to the invention, the sleeve of the kind defined above is essentially characterized in that its outer strength member is constituted by an integral portion of the connection arm, and in that it includes a cylindrical cage having an outside diameter that is slightly smaller than the inside diameter of the outer strength member, which cage has a shoulder at one of its axial ends formed by outwardly-directed radially-extending flange, the narrow channel being defined by said flange, by the portion of the cylindrical wall of the cage which extends from said flange, by the axial end of the outer strength member which is adjacent to said flange, and by an internal step in said outer strength member, and the connections between the cavities and the narrow channel being made via openings through the cylindrical side wall of the cage.

In preferred embodiments, use is made of one or more of the following dispositions:

the above openings constitute portions of larger windows formed through the cylindrical side wall of the cage and extending radially over the cavities;

at the axial end of the sleeve remote from the end having the flange, one of the two elements constituted by the cage and by the outer strength member have a radially folded margin that is axially juxtaposed against the axial end of the other element;

the cage is completely coated, with the possible exception of the plane outer face of its flange, in the elastomer material constituting the body; and the outer strength member and the arm are made up of two separate elements of stamped sheet metal that are welded together.

Apart from the above dispositions, the invention includes certain other dispositions which are preferably used simultaneously therewith and which are explained in greater detail below.

There follows a description of various preferred embodiments of the invention given with reference to the accompanying drawings and in a manner that is naturally not limiting.

FIG. 1 of the drawings is a diagrammatic overall view of a vehicle engine mounted on the chassis of the vehicle by means of sleeves of the invention.

Figure 2:
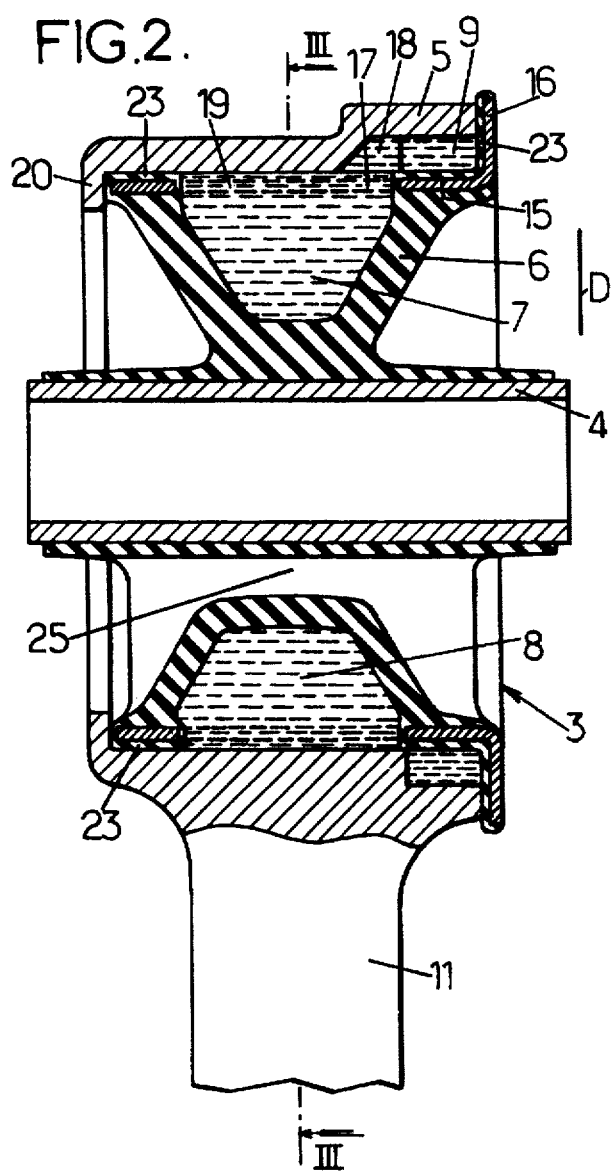
FIGS. 2 and 3 are respectively an axial section and a cross-section at a smaller scale on III—III of FIG. 2 through one of the sleeves.
Figure 5:
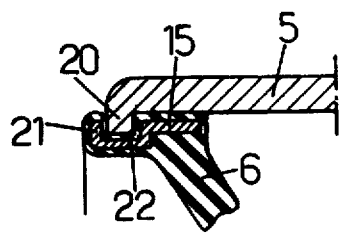
Figure 6:
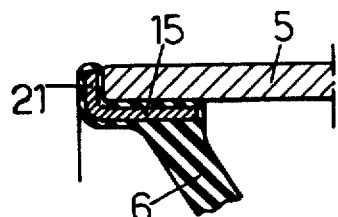
Figure 7:
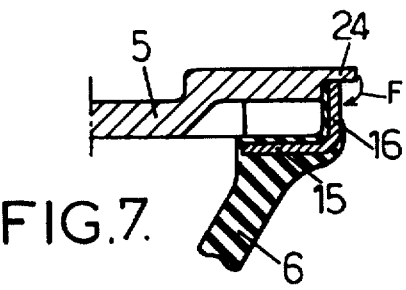

FIGS. 5, 6, and 7 show three respective variants of details of FIG. 2.

Figure 8:
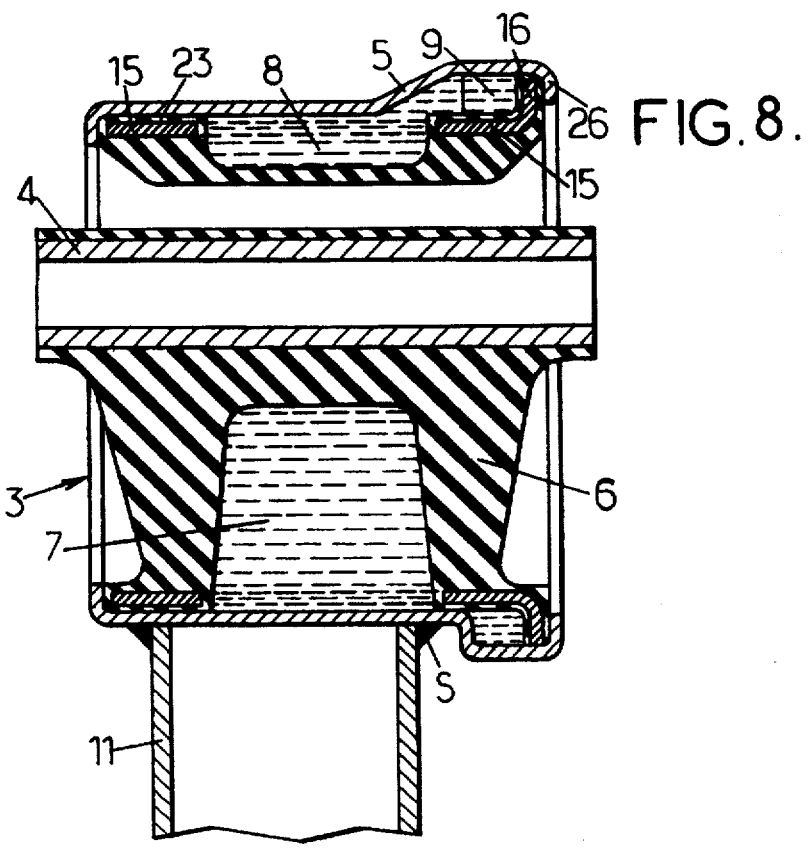

FIG. 8 is similar to FIG. 2 and shows a variant sleeve that is also in accordance with the invention.

Figure 9:
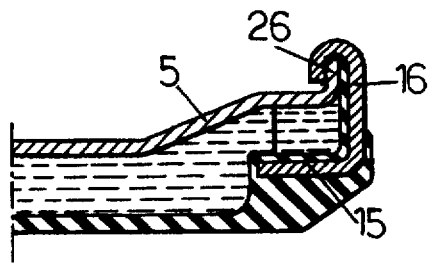
Figure 10:
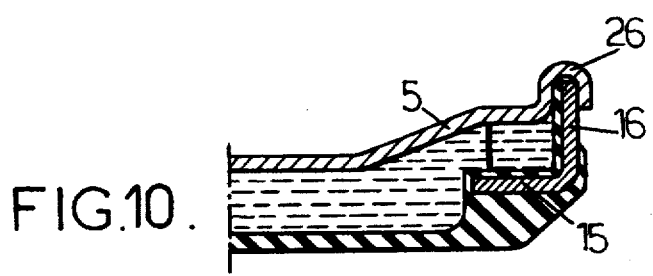
Figure 11:
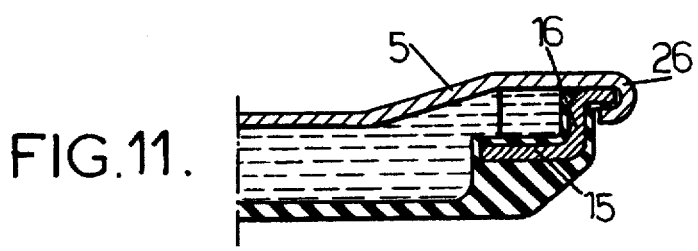

FIGS. 9, 10, and 11 show three respective variants of details of FIG. 8.

Figure 1:
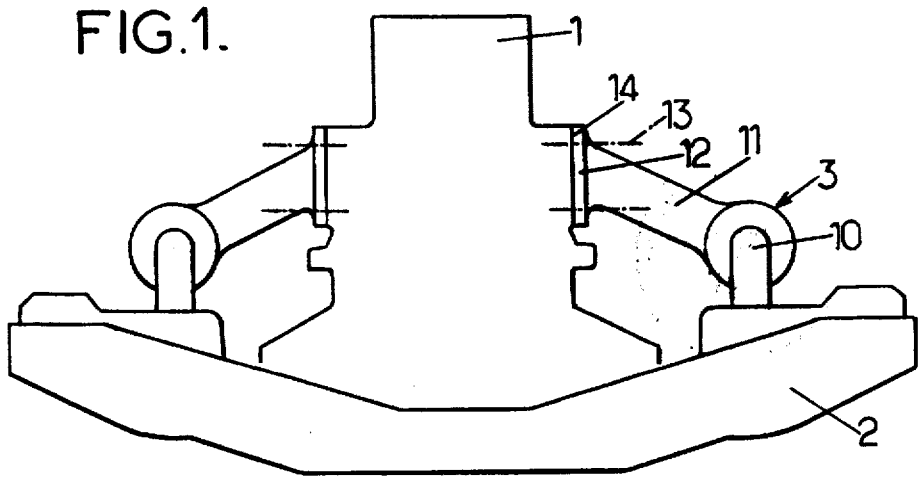

The idea is to mount an engine 1 of a vehicle on the chassis 2 of the vehicle as represented by a cross-member in FIG. 1, with the mounting being via at least two hydraulic antivibration sleeves each given overall reference 3.

In conventional manner, each sleeve 3 comprises:

a circularly symmetrical tubular inner metal strength member 4;

a circularly symmetrical tubular outer metal strength member 5 that surrounds the strength member 4 and that is substantially coaxial therewith in the strict geometrical sense, at least when the sleeve is in the assembled and loaded state; and an elastomer body 6 interconnecting the two strength members and forming between them two sealed cavities 7, 8 that are diametrically opposite on direction D.

The cavities 7 and 8 communicate with each other via a narrow channel 9.

The two cavities and the narrow channel are filled with a liquid as shown L.

The inner strength member 4 is designed to be secured to a pin (not shown) which passes therethrough and is in contact therewith and which is secured to the chassis 2 via parallel lugs 10 (FIG. 1) that may constitute a fork.

Figure 3:
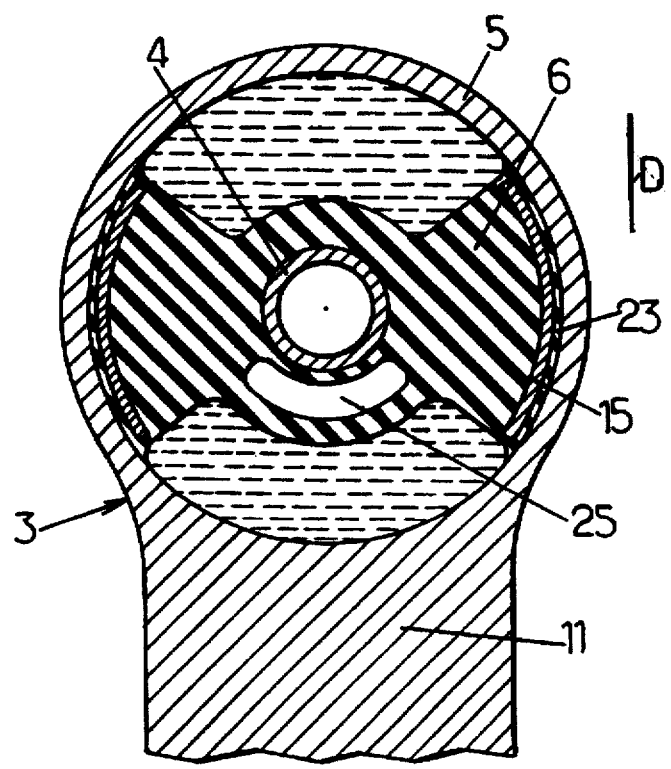

The outer strength member 5 is designed to be secured to the engine 1 via a rigid connection arm 11 (FIGS. 1,2, and 3).

Unlike known embodiments, in which the outer strength member is constituted by an independent length of tube which must be fixed to the end of the arm 11, in particular by being engaged as a force-fit in a complementary bearing formed in said end, in this case the said outer strength member is an integral portion of said arm 11.

By the term "integral portion", it is to be understood that the strength member and the arm are designed so as to form a single part only, even before the sleeve is made, which part may be constituted by a single element of cast alloy (FIG. 2)—which element may advantageously be reinforced by appropriate ribs (not shown)—or by a plurality of elements of stamped sheet metal that are themselves assembled together by welds S (see FIG. 8).

In other words, one end of the single arm and strength member part under consideration is likewise shaped to constitute a cylindrical housing or bearing, but in this case the bearing receives the elastomer body 6 directly instead of receiving an independent length of tube.

In this case, it is thus the portion of said part that defines the outside of said bearing which itself constitutes the outer strength member 5.

There is therefore no question of assembling the outer strength member 5 and the arm 11 after the sleeve has been made.

This characteristic provides significant savings, both with respect to the total number of component parts (since the independent length of tube can be eliminated completely in this case) and in labor (since all of the assembly operations concerning said independent length of tube are eliminated in this case).

In conventional manner, the part 5, 11 may itself include a fixing plate 12 that is easily fixed by means of appropriate nut and bolt systems 13 on a complementary bearing surface 14 of the engine 1.

To make the narrow channel 9, a cylindrical cage 15 is used having an outside diameter that is slightly smaller than the inside diameter of the outer strength member 5 so as to enable it to be engaged therein, said cage having a shoulder at one of its axial ends formed by an outwardly-directed radially-extending flange 16 suitable for coming into contact with the adjacent axial end of the outer strength member 5.

The flange 16 co-operates with said end of the strength member 5 to define two lateral faces of the narrow channel 9, which then has a section that is rectangular. The other two faces of said channel are respectively defined by the portion of the cylindrical wall of the cage 15 that is adjacent to the flange 16, and by the inside face of a radial step in the strength member 5.

The connections between each of the cavities 7 and 8 and the narrow channel 9 are formed by openings 17 made through the cylindrical side wall of the cage 15 and by angled passages 18 that are hollowed out in the inside cylindrical face of the strength member 5.

Figure 4:
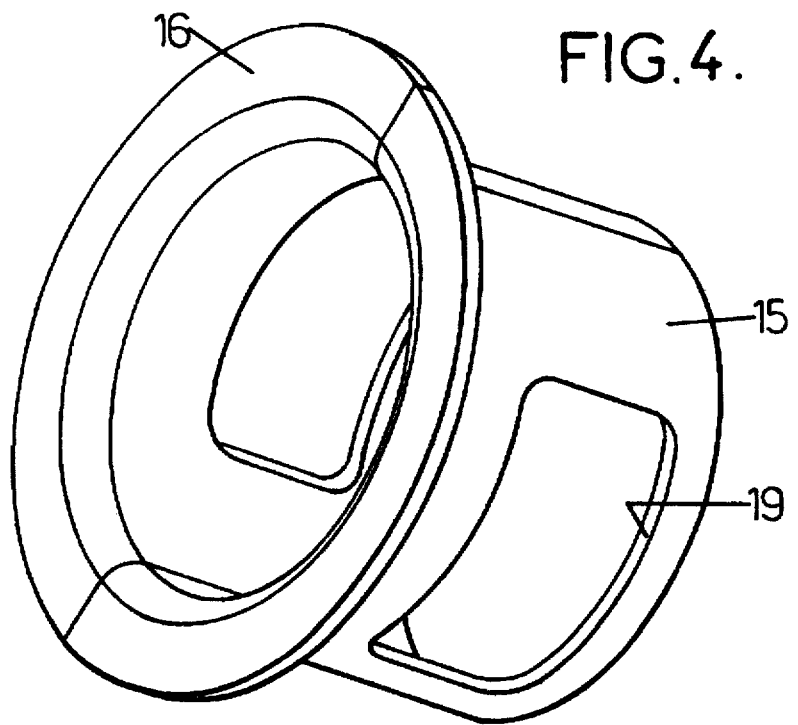
FIG. 4 is a perspective view of a component part of the sleeve.

Advantageously, the openings 17 constitute small portions of wider windows 19 which are hollowed out in the cylindrical side wall of the cage 15 radially overlying the cavities 7 and 8 (see FIGS. 2 and 4): the presence of the windows 19 facilitates-molding of the elastomer body 6.

At the axial end of the sleeve 3 remote from the end having the flange 16, one of the two elements constituted by the strength member 5 and by the cage 15 has a radially folded margin that is juxtaposed against the axial end of the other element.

In the embodiment of FIG. 2, the folded margin in question is given reference 20 and forms a portion of the strength member 5 which extends towards the axis of the sleeve.

The facing axial end of the cage 15 is then merely juxtaposed against the rim 20.

In the variant of FIG. 5, each of the two adjacent axial ends, one belonging to the strength member 5 and the other to the cage 15, is folded radially towards the other, the radially outwardly extending lip 21 that terminates the cage 15 itself being connected to the cylindrical wall of the cage via a bent area 22 constituting a groove that is open in a radially outward direction; in which case the lip 20 of the strength member 5 is inserted radially into the groove 22 and it is possible to make one of the two lips 20 and 21 as a discontinuous succession of tongues, given that sealing requirements concerning them are less strict than in the example of FIG. 2 because of the sinuous path that results therefrom for any possible leakage of the liquid.

In the case shown in FIG. 6, it is only the axial end of the cage 15 including a rim 21 that extends radially outwards, which rim overlies the unfolded adjacent axial end of the strength member 5.

In the variant shown in FIG. 7, the flange 16 is not pressed axially against all of the end edge of the strength member 5: it is pressed against only an inner portion of said edge, corresponding to $\frac{2}{3}$ of its radial thickness, for example, and the outer portion of said edge projecting from the remainder of said thickness is extended axially by a thin narrow collar 24 suitable for being crimped down in the direction of arrow F onto the flange 16: this type of assembly locks the cage 15 axially within the strength member 5.

In all cases, it is advantageous to coat the cage 15 completely (with the possible exception of the plane outside face of the flange 16) in the elastomer material from which the body 6 is made, said coating being performed during manufacture of said body: the thin covering layer 23 of elastomer that is visible in the drawings is the result of this coating and by its mere presence it ensures good sealing for the sleeve relative to the liquid, which sealing is achieved automatically during the force-fit engagement of the body 6 as reinforced by the cage 15 within the outer tubular strength member 5.

An examination of FIGS. 2 and 3 shows that the two cavities 7 and 8 are not absolutely symmetrical one to the other about the axial plane perpendicular to the direction D: around the cavity 7, the elastomer body 6 has a U-shaped or V-shaped axial section whose tip is bonded to the strength member 4, whereas around the cavity 8 the body 6 is U-shaped and its tip remains separate from said strength member 4, leaving an empty gap 25 that passes axially right the way through the sleeve.

As mentioned above, the sleeve shown diagrammatically in FIG. 8 differs essentially from that shown diagrammatically in FIG. 2 in that the "one-piece" part formed by the outer strength member 5 and the arm 11 is constituted by elements of stamped sheet metal which are welded together at S.

In this variant, the tubular element constituting the outer strength member 5 is thinner than before and its margin 26 is therefore better suited to being folded down for crimping purposes while being assembled with the flange 16.

Several examples of such crimping relating to the margin and/or the flange are shown in FIGS. 8,9,10, and 11:

in FIG. 8, the margin 26 is folded on its own towards the axis and it overlies the flange 16;

in FIG. 9, the margin 26 is folded radially outwardly and it is covered by the margin of the flange 16;

in FIG. 10, the margin 26 is initially folded radially outwardly around the flange 16, and subsequently is folded inwardly thereover; and in FIG. 11, the outer margin of the flange 16 extends axially outwardly and is in turn covered by the margin 26.

It should be observed that in all cases the special structure of the narrow channel 9 that is partially defined by the outwardly-directed radially-extending flange 16 of the cage 15 constitutes a projecting portion of the outer tubular strength member 5.

As a result, and unlike the outer strength members of known sleeves, said outer strength member 5 is unsuitable in the present case for being axially engaged fully within a receiving bearing, and there is no need for it to be received in that way.

In other words, the two features constituted by the single-piece structure of the unit comprising the arm and the outer strength member (11–5) and by the narrow channel 9 being defined in part by the radial flange 16 protecting from the cage 15 combine to produce an effect specific to those features being combined.

As a result, whichever embodiment is adopted, a hydraulic antivibration sleeve is obtained whose structure and operation are sufficiently clear from the above.

The sleeve presents certain advantages over previously-known sleeves, and in particular:

the advantage of eliminating an independent length of tube that would otherwise normally constitute the outer strength member; and the advantage of considerably simplifying the manufacture of the "narrow channel" interconnecting the two cavities, with this being due to the presence of the cage having a shoulder constituted by an outwardly-directed radially-extending flange.

Naturally, and as can be seen from the above, the invention is not limited in any way to the particular embodiments and applications described in detail; on the contrary, the invention extends to all variants thereof.

We claim:

1. A hydraulic antivibration support sleeve comprising:
   inner and an outer tubular rigid strength members with said outer strength member surrounding said inner strength member having a longitudinal axis, the strength members being united by an elastomer body shaped so as to co-operate therewith to form at least two diametrically opposite sealed cavities communicating with each other via a narrow channel, said cavities and said channel being completely filled with a damping liquid, a portion of the elastomer body that delimits at least one of the cavities having an axial section that is generally U-shaped or V-shaped and that is outwardly open in a radial direction, and the narrow channel that interconnects the two cavities extending along an arc of a circle centered on the longitudinal axis of the strength members and disposed adjacent an axial end of the outer strength member, wherein the outer strength member is constituted by an integral portion of a rigid arm suitable for connecting the sleeve to a rigid structure that is offset from said sleeve, and wherein said sleeve includes a rigid cage which is coated with an elastomer constituting an elastomer body, said cage comprising a cylindrical side wall which is fitted into the outer strength member in sealing contact therewith, said cage further comprising a flange which extends radially outwardly from said cylindrical side wall at an axial end thereof, the narrow channel having a cross section delimited by four sides which are defined respectively by said flange, by a portion of the cylindrical side wall of the cage which extends from said flange, by an internal surface of the outer strength member which is adjacent to said flange, and by an internal step formed in said outer strength member, and and wherein the connections between the cavities and the narrow channel are provided via openings formed through the cylindrical side wall of the cage.

2. A sleeve according to claim 1, wherein the openings constitute portions of larger windows formed through the cylindrical side wall of the cage and extending radially over the cavities.

3. A sleeve according to claim 1, wherein at an axial end of said sleeve which is remote from the end having the flange, one of the two elements constituted by the cage and by the outer strength member have a radially folded margin that is axially juxtaposed against the axial end of the other element.

4. A sleeve according to claim 1, wherein the outer strength member and the arm are made up of two separate elements of stamped sheet metal that are welded together.

* * * * *